(12) United States Patent
Wang et al.

(10) Patent No.: US 8,078,582 B2
(45) Date of Patent: Dec. 13, 2011

(54) DATA CHANGE ORDERING IN MULTI-LOG BASED REPLICATION

(75) Inventors: Rui Wang, Redmond, WA (US); Peter Byrne, Bellevue, WA (US); Leigh M. Stewart, Seattle, WA (US); Robin D. Dhamankar, Bellevue, WA (US); Qun Guo, Bellevue, WA (US); Michael E. Habben, Sammamish, WA (US); Xiaowei Jiang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 312 days.

(21) Appl. No.: 12/418,635

(22) Filed: Apr. 6, 2009

(65) Prior Publication Data

US 2010/0257138 A1    Oct. 7, 2010

(51) Int. Cl.
*G06F 17/30* (2006.01)

(52) U.S. Cl. ........................................... 707/648
(58) Field of Classification Search .............. 707/648
See application file for complete search history.

(56) References Cited

U.S. PATENT DOCUMENTS

| | | | |
|---|---|---|---|
| 5,287,501 A | 2/1994 | Lomet | |
| 5,469,562 A | 11/1995 | Saether | |
| 5,991,771 A * | 11/1999 | Falls et al. ............................. | 1/1 |
| 6,226,650 B1 | 5/2001 | Mahajan et al. | |
| 6,671,686 B2 | 12/2003 | Pardon et al. | |
| 6,732,124 B1 | 5/2004 | Koseki et al. | |
| 7,076,508 B2 * | 7/2006 | Bourbonnais et al. ................ | 1/1 |
| 7,487,160 B2 | 2/2009 | Whyte | |
| 7,490,113 B2 * | 2/2009 | Bourbonnais et al. ................ | 1/1 |
| 7,801,846 B2 * | 9/2010 | Devine et al. .................. | 707/609 |
| 2004/0260719 A1 | 12/2004 | Giraud-Sauveur et al. | |
| 2005/0193035 A1 | 9/2005 | Byrne | |
| 2008/0027987 A1 | 1/2008 | Arora et al. | |

OTHER PUBLICATIONS

Nishimoto Michael,"The Log Manager (xLM) ", Retrieved at<<http://oss.sgi.com/projects/xfs/design_docs/xfsdocs93_pdf/log_mgr.pdf>>, Silicon Graphics Proprietary, Mar. 28, 1994, pp. 1-10.

* cited by examiner

*Primary Examiner* — James Trujillo
*Assistant Examiner* — Jorge A Casanova (57) ABSTRACT

Aspects of the subject matter described herein relate to data change ordering in multi-log based replication. In aspects, local seeds are maintained for subtransactions involved in a transaction, where each subtransaction may occur on a different node that hosts one or more database fragments involved in the transaction. When a subtransaction communicates with another subtransaction in a transaction, the subtransaction sends its local seed to the other subtransaction. The receiving subtransaction compares its local seed with the received seed and updates its local seed if the received seed is logically after its local seed. A subtransaction uses a local seed to generate sequence identifiers for changes made by the subtransaction. These identifiers allow data changes of a transaction that are made on multiple nodes to be partially ordered relative to other changes made during the transaction.

18 Claims, 6 Drawing Sheets

DATA CHANGE ORDERING IN MULTI-LOG BASED REPLICATION

BACKGROUND

In an effort to make a database more scalable, available, and failure-resistant, the database may be hosted on multiple nodes each of which hosts zero or more fragments of the database. Different tables of a database may be distributed on different database fragments and different data records of the same table may be distributed on different database fragments.

One way to replicate a database distributed on multiple nodes to a remote node is to shut down the database and copy data associated with the database onto the remote node. Although this technique is able to provide a consistent image of a database to be copied to the remote node, it involves database downtime. Depending on the size of the database, the time the database is shut down may vary from hours to days or longer to obtain the image. Shutting down a heavily used database even for a short period of time, however, may be unacceptable from a business perspective.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to data change ordering in multi-log based replication. In aspects, local seeds are maintained for subtransactions involved in a transaction, where each subtransaction may occur on a different node that hosts one or more database fragments involved in the transaction. When a subtransaction communicates with another subtransaction in a transaction, the subtransaction sends its local seed to the other subtransaction. The receiving subtransaction compares its local seed with the received seed and updates its local seed if the received seed is logically after its local seed. A subtransaction uses a local seed to generate sequence identifiers for changes made by the subtransaction. These identifiers allow data changes of a transaction that are made on multiple nodes to be partially ordered relative to other changes made during the transaction.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." Other definitions, explicit and implicit, may be included below.

Exemplary Operating Environment

Figure 1:
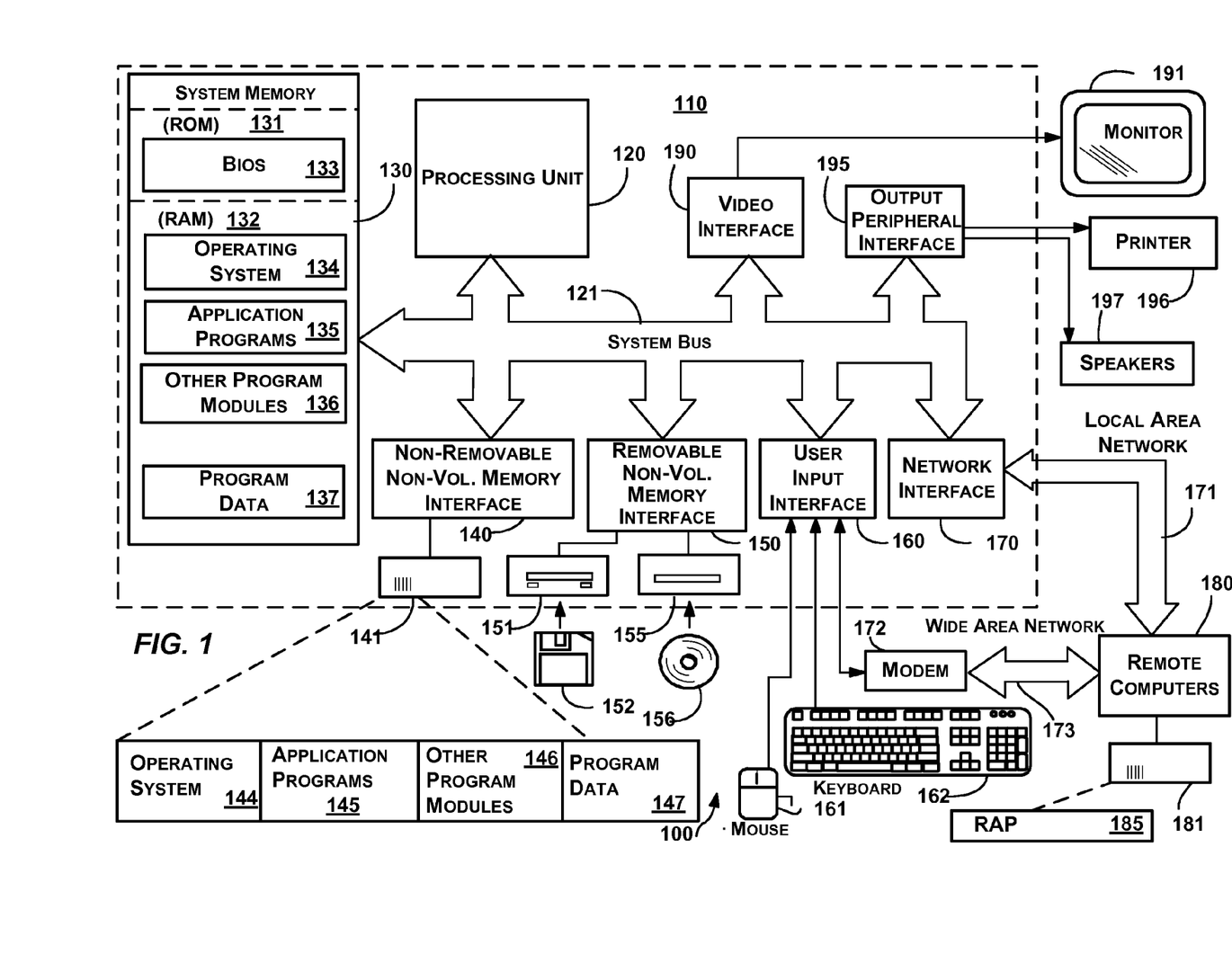
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus through a non-removable memory interface such as interface 140, and magnetic disk drive 151 and optical disc drive 155 are typically connected to the system bus by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data are given different numbers herein to illustrate that, at a minimum, they are different copies.

A user may enter commands and information into the computer 20 through input devices such as a keyboard and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Log Based Replication

Figure 2:
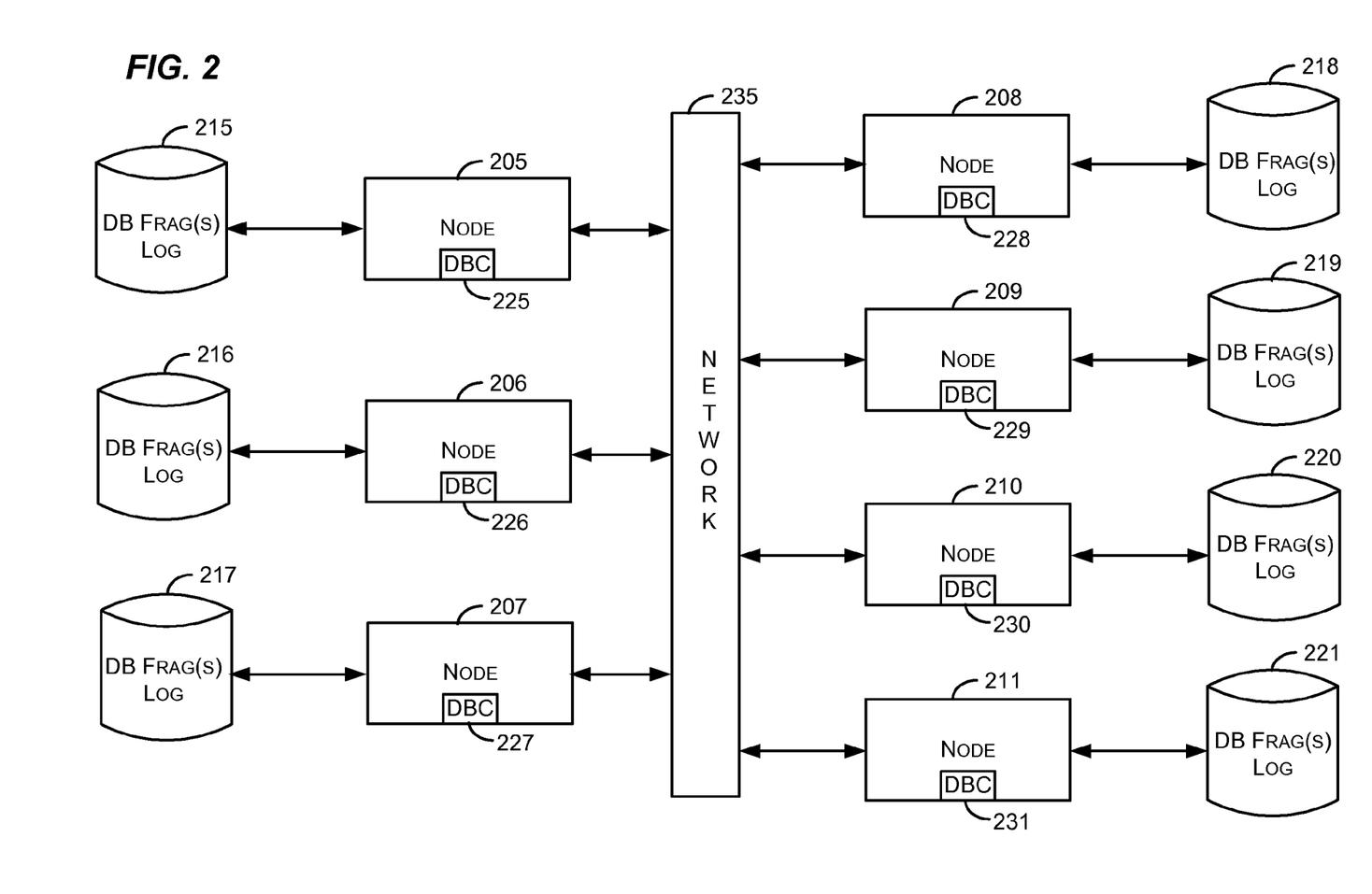
FIG. 2 is a block diagram representing an exemplary environment in which aspects of the subject matter described herein may be implemented.

As mentioned previously, a database may be hosted as fragments on multiple nodes. FIG. 2 is a block diagram representing an exemplary environment in which aspects of the subject matter described herein may be implemented. The environment may include various nodes 205-211, stores 215-221, a network 235, and may include other entities (not shown). The nodes 205-211 may include database components 225-231. The various entities may be located relatively close to each other or may be distributed across the world. The various entities may communicate with each other via various networks including intra- and inter-office networks and the network 235.

In an embodiment, the network 235 may comprise the Internet. In an embodiment, the network 235 may comprise one or more local area networks, wide area networks, direct connections, virtual connections, private networks, virtual private networks, some combination of the above, and the like.

Each of the nodes 205-211 may comprise or reside on one or more general or special purpose computing devices. Such devices may include, for example, personal computers, server computers, hand-held or laptop devices, multiprocessor systems, microcontroller-based systems, set top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as a node comprises the computer 110 of FIG. 1.

The stores 215-221 comprise any storage media capable of storing data. The term data is to be read broadly to include anything that may be operated on by a computer. Some examples of data include information, program code, program state, program data, other data, and the like. A store may comprise a file system, database, volatile memory such as RAM, other storage, some combination of the above, and the like and may be distributed across multiple devices. A store may be external, internal, or include components that are both internal and external to the node to which the store is associated.

Data stored in the stores 215-221 may be organized in tables, records, objects, other data structures, and the like. The data may be stored in HTML files, XML files, spreadsheets, flat files, document files, and other files. Data stored on the stores 215-221 may be classified based on a model used to structure the data. For example, data stored on the stores 215-221 may comprise a relational database, object-oriented database, hierarchical database, network database, other type of database, some combination or extension of the above, and the like.

The stores 215-221 may be accessed via components of a database management system (DBMS). A DBMS may comprise one or more programs that control organization, storage, management, and retrieval of data in a database. For example a DBMS may have database components 225-231 that reside on the nodes 205-211, respectively. A DBMS may receive requests to access data in the database and may perform the operations needed to provide this access. Access as used herein may include reading data, writing data, deleting data, updating data, a combination including one or more of the above, and the like.

In describing aspects of the subject matter described herein, for simplicity, terminology associated with relational databases is sometimes used herein. Although relational database terminology is often used herein, the teachings herein may also be applied to other types of databases including those that have been mentioned previously.

Each store may include one or more database fragments (sometimes referred to herein simply as "fragments") as well as one or more logs associated with the transactions that operate on the fragments. A fragment may include one or more records of a database. In relational databases, a record may comprise a row of a table, for example.

In one embodiment, a store may store different fragments than the fragments that are stored on other stores. In another embodiment, one or more fragments may be replicated on two or more store.

Logically, each database fragment is associated with a transaction log. In implementation, one or more database fragments in a single store may share a single transaction log or each database fragment may have its own transaction log.

A transaction may include multiple subtransactions. Each subtransaction may include one or more data changes on one or more database fragments. In one embodiment, a subtransaction may include all data changes for a transaction for database fragments hosted by a single node.

A transaction includes a root subtransaction and zero or more other subtransactions. In one embodiment, the root subtransaction is the subtransaction on which the transaction begins. The root subtransaction may be responsible for requesting that the transaction is committed. Each subtransaction may involve other subtransactions in the transaction.

A node that involves a subtransaction may send one or more requests to one or more other nodes that include database fragments that are involved in the transaction. Sending a request to do transactional work from a node involved in a subtransaction to another node involved in the transaction is sometimes referred to as the subtransaction sending the request. A request may include requesting that another node make certain data changes within the scope of the transaction. A data change to a data fragment hosted on a node may be associated with a subtransaction that occurs on the node. Each node may maintain one or more logs of changes that occur to database fragments hosted on the node.

Some data changes of a transaction have a particular order in which they are to be performed while other data changes may be performed in any order. In order-dependent data changes, a subtransaction waits until a data change is made before making another data change or sending a request that another data change be made. When two or more non order-dependent data changes are part of a transaction, the two or more non order-dependent data changes may be made in any order to different fragments on one or more nodes without consultation with a centralized sequencing component.

When two or more non order-dependent data changes are part of a transaction, the two or more non order-dependent data changes may be performed in parallel. Being performed in parallel does not necessarily mean that the two changes are performed at exactly the same time or that one of the changes does not complete before work on another of the changes is even started. Being performed in parallel means that two or more nodes (or even processes, threads, or the like on the same node) may be requested to perform data changes and the relative order in which the two or more nodes (or processes, threads, or the like) make the data changes is irrelevant. As used herein, indicating that two or more data changes may be performed in parallel means that the data changes may occur in any order without loss of database consistency.

Figure 3:
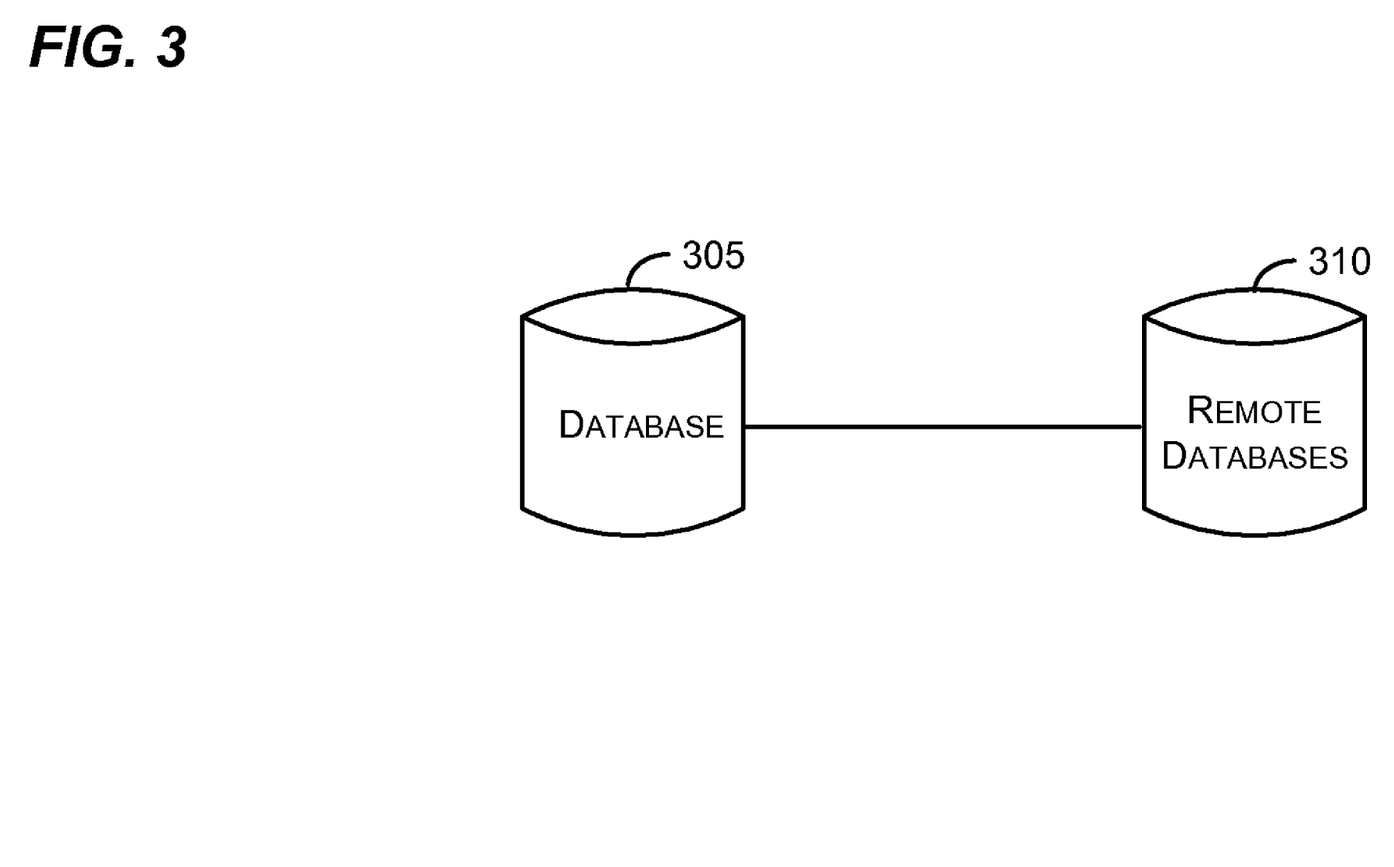
FIG. 3 is a block diagram that illustrates a database that is replicated to another database in accordance with aspects of the subject matter described herein.

FIG. 3 is a block diagram that illustrates a database that is replicated to another database in accordance with aspects of the subject matter described herein. Logically, the database 305 may comprise the combination of the database fragments stored in the stores 215-221 of FIG. 2.

To replicate data from the database 305 to the remote database(s) 310, one mechanism includes initializing the remote database(s) 310 to a consistent image of the database 305 and then sending a stream of changes that occur to the database 305 to the remote database(s) 310. The remote database(s) 310 may then apply the stream of changes to update their data so that their data stays up to date with the data on the database 305.

Note that although the word "remote" is used to describe the remote database(s) 310, that this does not refer to physical distance between nodes that host the database 305 and the remote database(s) 310. Indeed, the physical distance between nodes hosting the database 305 and the node(s) hosting the remote database(s) 310 may be minimal or even non-existent. For example, a remote database may be hosted on a node that hosts one or more of the fragments of the database 305.

To maintain consistency on the remote database(s) 310, changes in the stream of data changes need to be ordered in the same order in which they occur on the database 305 with some possible exceptions for changes that may occur in any order on the database 305. For example, if a change that adds a record that references another record is sent in the stream before a change that adds the other record, database constraints may be violated. As another example, if a database field is first set to a first value and then set to a second value, sending the changes in opposite order to the remote database(s) 310 will result in the wrong final value after the changes are applied.

Changes in the stream of data changes need to be ordered as described above both on a transaction basis and within transactions. Ordering changes appropriately where a database is segmented into fragments across multiple nodes, however, is challenging. This same challenge is faced in scenarios in which two or more database fragments are located on the same node but have separate log streams. Aspects of the subject matter described herein may also be applied to various scenarios including either of the above scenarios. Returning to FIG. 2, to capture change information, a data change in a database fragment generates a log record(s) in the database fragment's transaction log.

To deal with committed transactions, a timestamp associated with the transaction may be used to order the transactions. Each committed transaction has a commit logical timestamp, which may be provided at low cost, since transactions may be managed by a centralized transaction manager. If two transactions conflict (e.g., at least one data change from one of them conflicts with a data change from the other), the two transactions will have different commit timestamps to reflect the order of conflicting data changes. Based on these commit timestamps, the log records for transactions from all logs of a database may be ordered in the order in which the transactions committed. This ensures that conflicting data changes from different transactions are provided in the original order.

However, within the same committed transaction, there may be data changes that conflict with or depend upon other data changes made during the transaction. Furthermore, the data changes may be located in different database fragments, and the log records of these data changes, although from different logs, may be associated with the same commit logical timestamp. When these data changes of the same transaction are merged, the original data change order (with some exceptions), needs to be followed when these data changes are applied to a replicated database.

For example, suppose there are two database fragments named dbfrg1 and dbfrg2 and a transaction is started:

```
begin transaction Tx
insert a row (k1, . . . ) into table pk_tab1
insert a row (k2, . . . , k1) into table fk_tab1, where k1 references
the row inside pk_tab1
commit transaction Tx
```

Further, suppose pk_tab1 is located in dbfrg1 and fk_tab1 is located in dbfrg2. After the inserts, the transaction log associated with dbfrg1 may include the following:

```
Begin transaction Tx
Insert row k1
Commit transaction Tx
```

After the inserts, the transaction log associated with dbfrg2 may include the following:

```
Begin transaction Tx
Insert row k2
Commit transaction Tx
```

In conjunction with reading the logs from both dbfrg1 and dbfrg2, data changes are extracted from log records including insert row k1 and insert row k2. To avoid a foreign key reference violation, when data changes are applied to a remote database, the data change "insert (k1, . . . ) into pk_tab1" is applied before "insert (k2, . . . , k1) into fk_tab1."

To keep track of the order of the data changes within a transaction, in one embodiment, each log record of a transaction may be associated with a sequence ID. In this embodiment, the sequence ID is unique within its associated transaction. In conjunction with writing a log record, a new sequence ID is obtained from the root subtransaction and put into the log record. After all data changes of the same transaction are extracted from the logs associated with the various database fragments, the sequence IDs may be used as a sort field to derive the original data change order.

In another embodiment, to keep track of the order of the data changes within subtransactions of a transaction, whenever a data change occurs, a sequence ID (sometimes referred to simply as an "identifier") is generated and placed in the log of the database fragment in which the change occurs. The sequence ID is generated from a seed (e.g., number) that is maintained with respect to a subtransaction of a node. The sequence IDs of various data changes in subtransactions of a transaction may be the same or different depending on whether the data changes are order dependent or not. The following exemplary actions may be taken to maintain the seed for each subtransaction.

1. When the root subtransaction of a transaction starts, the root subtransactions starts with a sequence ID of 1 or some other number.

2. When a subtransaction (either the root or another subtransaction that is part of the transaction) changes data, the sequence ID is stored in a log corresponding to the data. In addition, the seed on the subtransaction increases by 1 or some other pre-determined number that is consistent across subtransactions.

3. When a subtransaction sends a data change request to another subtransaction of the same transaction, the current seed of the sending subtransaction is sent along with the request.

4. After a subtransaction receives a request, the receiving subtransaction sets its current seed to be equal or logically after the received seed and its current seed. In embodiments in which the seed is incremented by one, the phrase "logically after" means a seed that is the seed plus one. In some embodiments, a function other than "increment by one" may be used to determine a seed that is logically after another seed. Some exemplary functions may include string functions, functions that involve hash functions, functions that involve operators other than or in addition to "+", combinations of one or more of the above, and the like.

In one embodiment, determining a new current seed from a received seed and a current seed may be performed by taking the maximum of the received seed and the receiving subtransaction's current seed. For example, suppose the current seed of the receiving subtransaction is x1 and the request being received has a seed of x2, the new seed of the receiving subtransaction becomes max(x1, x2).

5. When a subtransaction sends a response to another subtransaction, the sending subtransactions sends its current seed in conjunction with sending the response. A subtransaction may send a response that indicates that the subtransaction has made changes or performed other transactional work requested by the receiving transaction.

6. When a subtransaction receives a response from another subtransaction, the receiving subtransaction sets its current seed as indicated above in step 4.

An underlying assumption of the above actions is that if two data changes within a transaction may occur in parallel in different database fragments, their relative order is irrelevant. The above technique of ID generation does not guarantee uniqueness of IDs within a transaction, but maintains an ordering (i.e., a partial order in which parallel changes may occur in any order but sequential changes occur in a deterministic order) among data changes within a transaction.

An exemplary data change scenario is as follows:

In this example, a transaction starts with two changes (i.e., dc10 and dc20) in sequence in a database fragment dbfrg1. These changes start on a root subtransaction. The root subtransaction then sends requests for the data change dc30 and dc40 to a subtransaction associated with the database fragment dbfrg2, where dc30 and dc40 occur in sequence. The sending subtransaction may not know exactly what and how many data changes will occur with the receiving subtransaction.

After sending the request to the subtransaction associated with dbfrg2, the data change dc50 occurs in dbfrg1. This means that dc50 occurs in parallel with dc30 and dc40. After dc50 occurs and after the response is sent from dbfrg2 back to dbfrg1, dc60 occurs in dbfrg1.

In this example, the data changes may be assigned identifiers as follows:

|  | Data change | | | | | |
| --- | --- | --- | --- | --- | --- | --- |
|  | dc10 | dc20 | dc30 | dc40 | dc50 | dc60 |
| Identifier | 1 | 2 | 3 | 4 | 3 | 5 |

Although the environments described above includes various numbers of the entities and related infrastructure, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 4:
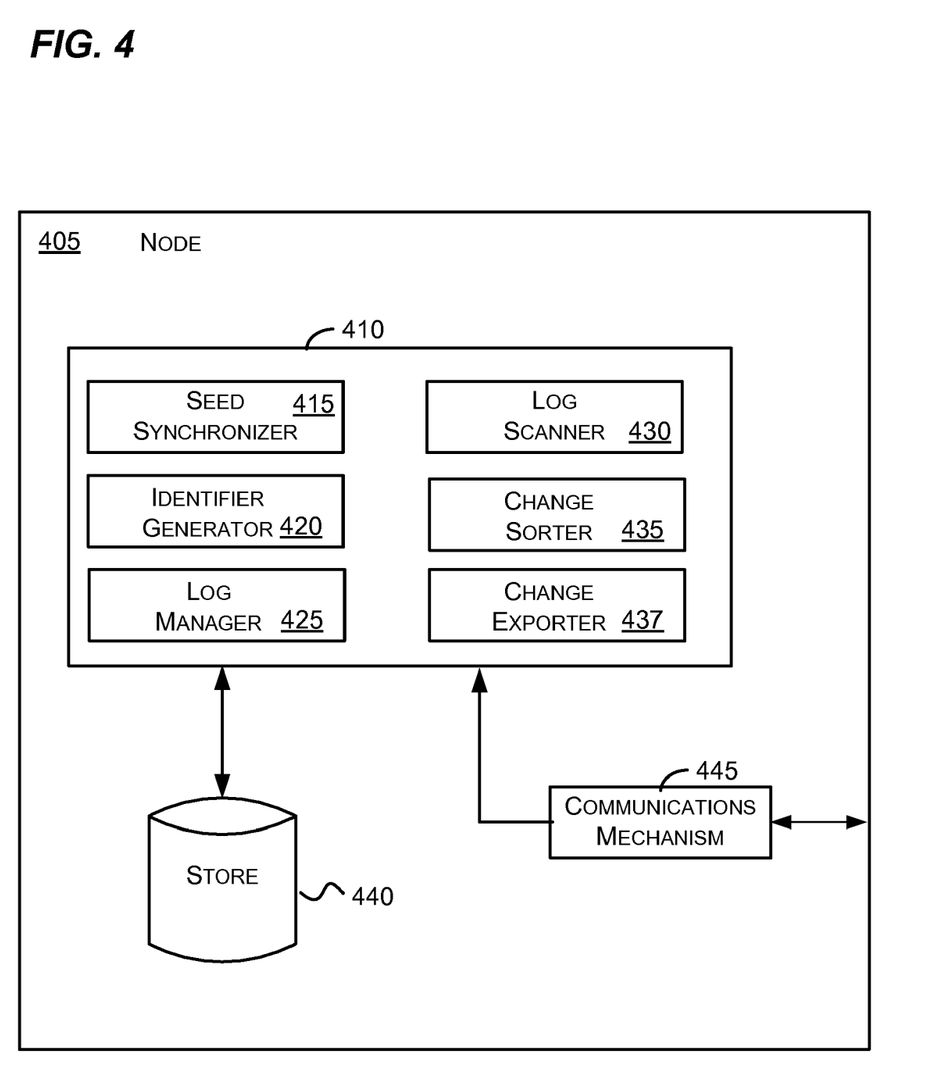
FIG. 4 is a block diagram that represents an apparatus configured in accordance with aspects of the subject matter described herein.

FIG. 4 is a block diagram that represents an apparatus configured in accordance with aspects of the subject matter described herein. The components illustrated in FIG. 4 are exemplary and are not meant to be all-inclusive of components that may be needed or included. In other embodiments, the components and/or functions described in conjunction with FIG. 4 may be included in other components (shown or not shown) or placed in subcomponents without departing from the spirit or scope of aspects of the subject matter described herein. In some embodiments, the components and/or functions described in conjunction with FIG. 4 may be distributed across multiple devices.

Turning to FIG. 4, the node 405 may include database components 410, a store 440, a communications mechanism 445, and other components (not shown). The node 405 may be implemented as a special or general purpose computer (e.g., as the computer 110 of FIG. 1).

The database components 410 may include a seed synchronizer 415, an identifier generator 420, a log manager 425, a log scanner 430, a change sorter 435, a change exporter 437, and other components (not shown).

The communications mechanism 445 allows the node 405 to communicate with other nodes (e.g., the nodes 205-211 of FIG. 2). The communications mechanism 445 may be a network interface or adapter 170, modem 172, or any other mechanism for establishing communications as described in conjunction with FIG. 1.

The store 440 is any storage media capable of storing data. The store 440 corresponds to the stores 215-221 of FIG. 2 and may be used in a similar way as the stores 215-221 as described previously.

The seed synchronizer 415 is operable to synchronize a local seed of a subtransaction of a transaction with other seeds of other subtransactions of the transaction. To do this, the seed synchronizer 415 may receive a remote seed from a second subtransaction and potentially update a local seed based on values of the remote and local seeds. For example, if the remote seed is logically after the local seed, the seed synchronizer 415 may update the local seed to be equal to or logically after the remote seed.

The identifier generator 420 is operable to determine an identifier using the local seed. As mentioned previously, because some updates may proceed in parallel, the identifier determined by the identifier generator 420 may be identical to another identifier determined by another identifier generator of another subtransaction of the transaction. In other words, when determining an identifier, the identifier generator 420 does so without regard to the identifiers being determined by other identifier generators; instead the identifier generator 420 uses the local seed. The identifier is usable to order changes that occur within the transaction as previously described.

The log manager 425 is operable to associate an identifier determined by the identifier generator 420 with a record of the log that includes a change. The log manager 425 may do this by, for example, by collocating (e.g., writing next to or in close proximity) the identifier with the record in the log. As another example, if each record in a particular log has a unique identifier, the identifier may be associated with a record via an association table that includes the unique identifier of the record and the identifier that indicates ordering within a subtransaction. As another example, the identifier may be embedded in the log record structure. Based on the teachings herein, those skilled in the art may recognize other mechanisms for associating the identifier with the record of the log that may also be used without departing from the spirit or scope of aspects of the subject matter described herein.

The log manager 425 may also provide access to the log to other components as needed.

The log scanner 430 is operable to access the store to obtain records regarding changes together with their associated identifiers and to send data about the changes derived from the records together with their associated identifiers to the change sorter 435.

The change sorter 435 is operable to receive change information associated with subtransactions of the transaction together with associated identifiers and is further operable to sort the change information based on the identifiers. The change sorter 435 may also be operable to sort change information based on transaction commit time. For example, if the change sorter 435 obtains logs from other nodes and the node 405 is in charge of exporting these changes to another database, the change sorter 435 may sort changes first on commit times and then by identifiers.

The change exporter 437 is operable to export the change information to another database for use in updating the other database with the change information.

If the node 405 is not in charge of exporting changes to another database, the change sorter 435 and the change exporter 437 may be omitted. In another embodiment, a node that does not host one of the database fragments may host the change sorter 435 and the change exporter 437. In one embodiment, the receiving database may host the change sorter 435 and may use the change sorter 435 to sort change information before changes are applied to the replicated database.

Figure 5:
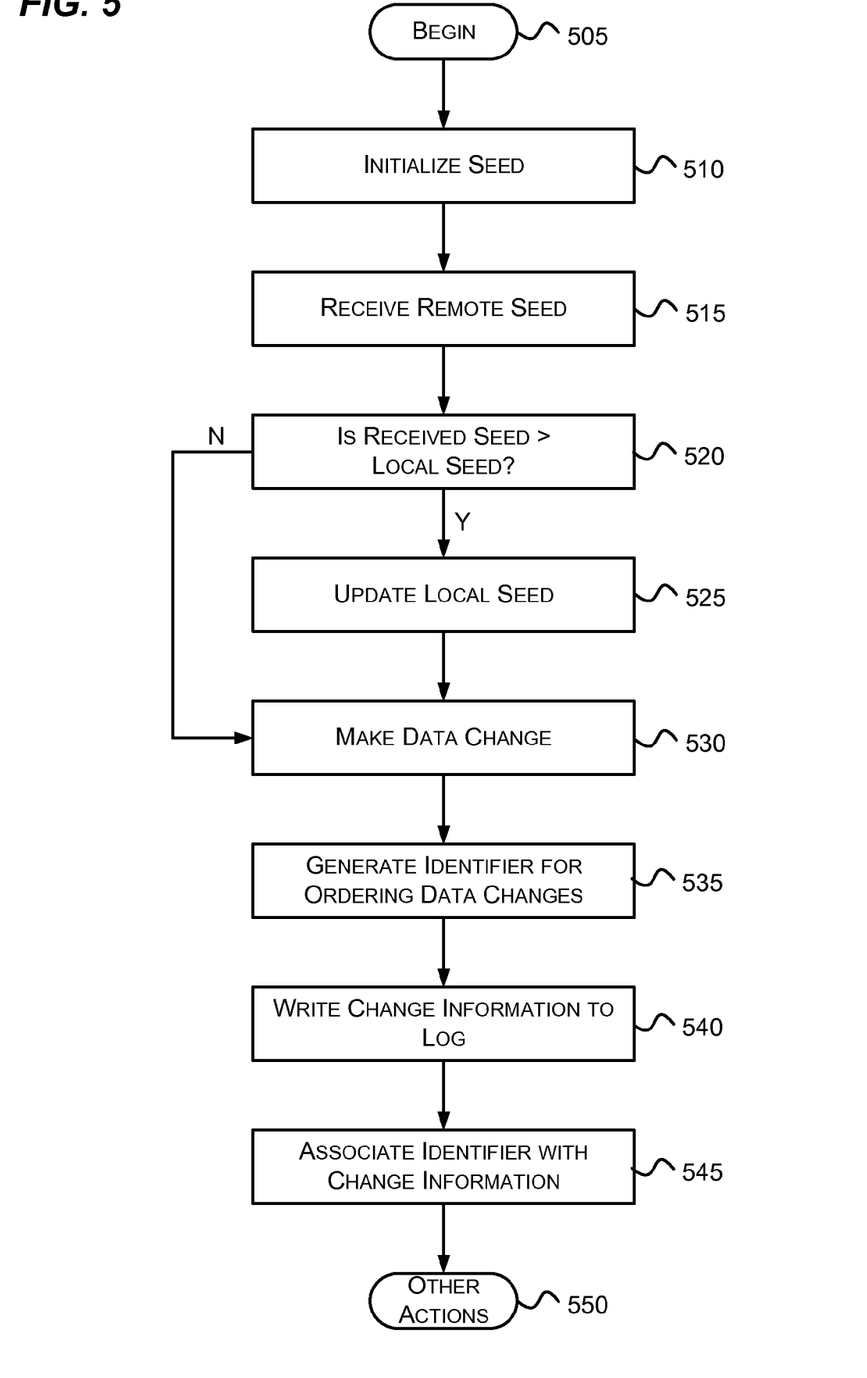
FIG. 5 is a flow diagram that generally represents exemplary actions that may occur within a subtransaction in accordance with aspects of the subject matter described herein.
Figure 6:
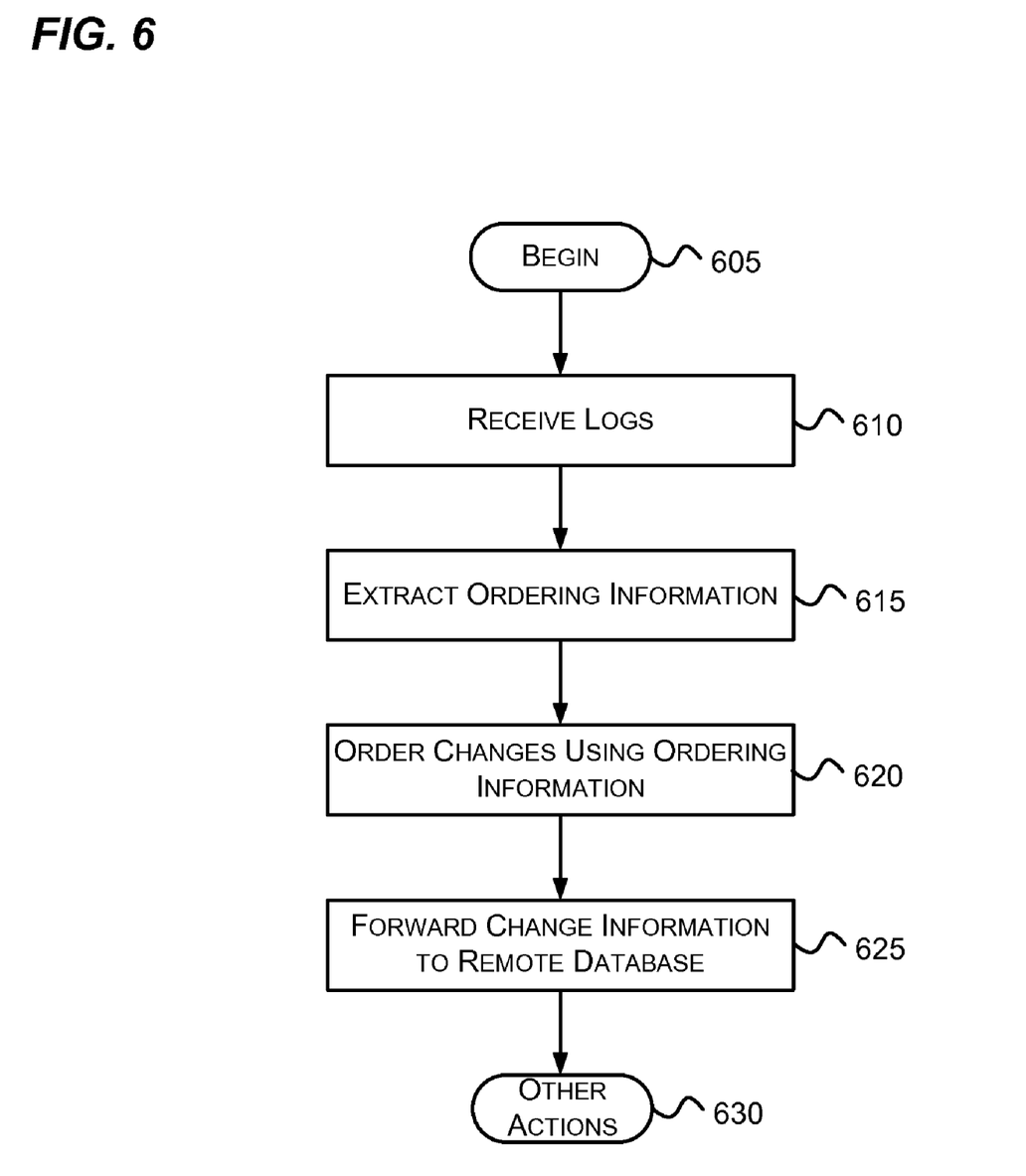
FIG. 6 is a flow diagram that generally represents exemplary actions that may occur in updating another database in accordance with aspects of the subject matter described herein.

FIGS. 5-6 are flow diagrams that generally represent actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 5 is a flow diagram that generally represents exemplary actions that may occur within a subtransaction in accordance with aspects of the subject matter described herein. Turning to FIG. 5, at block 505, the actions begin.

At block 510, the seed of a subtransaction is initialized. For example, at a root subtransaction, the seed may be set to 1. The seed at other subtransactions may be initialized when they first receive seeds from another subtransaction of the transaction.

At block 515, a seed is received from another subtransaction. For example, referring to FIG. 2, a subtransaction associated with one or more fragments on the store 218 may receive a seed of 3 from the subtransaction associated with one or more fragments on the store 216. The seed may be conveyed with a request to make data changes or may be a response from a subtransaction that has made data changes.

At block 520, a determination is made as to whether the received seed is logically after the current seed of the subtransaction. If so, the actions continue at block 525; otherwise, the actions continue at block 530. For example, referring to FIG. 4, if the current seed is 1 and the received seed is 3, the seed synchronizer 415 determines that the received seed is logically after the current seed.

At block 525, the current seed is updated. For example, referring to FIG. 4, the seed synchronizer 415 updates the current seed to be equal to or logically after the received seed. Using the example described in conjunction with block 520, the seed synchronizer updates the current seed to 3 or a number larger than three.

At block 530, a data change is made in the subtransaction. For example, referring to FIG. 2, a data change may be made to a database fragment in the store 216.

At block 535, an identifier is generated. For example, referring to FIG. 4, the identifier generator 420 may generate an identifier for the data change made at block 530. Using the example referred to in conjunction with block 525, the identifier generator 420 may generate an identifier of 3 corresponding to the current seed of 3. Note that more complicated identifier generation functions may be used, if desired, so long as the identifier so generated is usable to order data changes relative to other data changes occurring in subtransactions of the transaction.

At block 540, change information corresponding to the data change is written to the log. For example, referring to FIG. 4, the log manager 425 may be used to write information regarding the data change to a database fragment to a log associated with the database fragment. The change information indicates any changes made via the data change and may be used later to update a remote database with the changes.

At block 545, the identifier is associated with the change information. For example, referring to FIG. 4, the log manager 425 associates the identifier with the change information as described previously.

At block 550, other actions, if any, are performed. For example, to send update information to a remote database, other actions may include (not necessarily in the order below):

1. Obtaining log information from the first log and the second log and any other logs, if any, associated with the database fragments;

2. Obtaining transaction changes related to the transaction from the log information 3. Sorting the transaction changes relative to changes made in other transactions based on commit times of the transaction and the other transactions; and 4. Sorting the transaction changes based on identifiers associated with the transaction changes.

5. Forwarding the transaction changes to a remote database to apply to the remote database to update the remote database such that the remote database is a logical replica as of a last commit time of the transaction and the other transactions.

Logical replica as used here indicates that the replicated data set on the remote database includes the same data as the replicated data set on the original database as of the last commit time but that how or where the data is stored is irrelevant. The replicated data set may include all or a portion of the original database. As long as any query on the replicated data set that could be issued to the remote database would return the same results as the same query issued to the original database as of the last commit time, the replicated data sets on the two databases are said to be logical replicas of each other as of the last commit time.

FIG. 6 is a flow diagram that generally represents exemplary actions that may occur in updating a remote database in accordance with aspects of the subject matter described herein. Turning to FIG. 6, at block 605, the actions begin.

At block 610, logs associated with database fragments of a database are received. For example, referring to FIGS. 2 and 4, the change sorter 435 may receive logs from the database fragments stored in the stores 215-221.

At block 615 ordering information is extracted from the logs. Ordering information may indicate commit times for transactions as well as subtransaction ordering information (e.g., the identifiers previously described) that indicates an order in which changes occurred within each transaction. For example, referring to FIG. 4, the change sorter 435 on the node 405 may be used to extract subtransaction ordering information from logs received by the node 405.

At block 620, changes are ordered according to the subtransaction ordering information. For example, referring to FIG. 4, the change sorter 435 may use transaction commit times as a first sort key and subtransaction ordering information as a second sort key to order change information as previously described.

At block 625, the change information is forwarded to a remote database to use in updating the remote database. For example, referring to FIG. 3, the change information may be exported from the database 305 to the remote database 310.

At block 630, other actions, if any, are performed.

As can be seen from the foregoing detailed description, aspects have been described related to data change ordering in multi-log based replication. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
partially ordering data changes of a transaction of a distributed database, the transaction comprising a first subtransaction and a second subtransaction, the first subtransaction and the second subtransaction being order-dependent, by:
receiving, at the first subtransaction that has a first seed, a second seed from the second subtransaction, the first and second subtransactions being part of the transaction that involves changes to database fragments associated with at least two logs, the first subtransaction being associated with a first log, the second subtransaction being associated with a second log;
if the second seed is logically after the first seed, updating the first seed to be equal to or logically after the second seed;
generating an identifier using the first seed, the identifier usable to order a data change relative to other data changes of the transaction;
making the data change associated with the first subtransaction;
writing change information regarding the data change to a database fragment to the first log, the change information indicating any changes made via the data change; and
associating the identifier with the change information.

2. The method of claim 1, wherein the first log is maintained on a different storage device than the second log.

3. The method of claim 1, wherein receiving a second seed from a second subtransaction, further comprises receiving the second seed where the transaction involves changes to database fragments from at least two nodes.

4. The method of claim 1, wherein updating the first seed to be equal to or logically after the second seed comprises executing a function that returns a maximum of the first and second seeds.

5. The method of claim 1, wherein generating an identifier using the first seed comprises setting the identifier to a value corresponding to the first seed.

6. The method of claim 1, wherein associating the identifier with the change information comprises collocating the identifier with the change information in the first log.

7. The method of claim 1, further comprising:
obtaining log information from the first log and the second log and any other logs, if any, associated with the database fragments;
obtaining transaction changes related to the transaction from the log information;
sorting the transaction changes relative to changes made in other transactions based on commit times of the transaction and the other transactions;
sorting the transaction changes based on identifiers associated with the transaction changes; and
forwarding the transaction changes as sorted to another database to apply to the other database to update the other database such that the other database includes a data set that is a logical replica of a corresponding data set on a database that includes the database fragments as of a last commit time of the transaction and the other transactions.

8. The method of claim 1, further comprising prior to receiving the second seed from the second subtransaction, sending the first seed to the second subtransaction together with a request to change one or more database fragments.

9. The method of claim 8, further comprising waiting for the second seed from the second subtransaction before making an additional data change.

10. The method of claim 8, further comprising making an additional data change in parallel with waiting for the second seed from the second subtransaction, and updating the first seed be logically after the first seed before receiving the second seed.

11. A computer storage medium having computer-executable instructions, which when executed perform actions, comprising:
receiving logs associated with database fragments, each log associated with a node, each log indicating changes that occurred to one or more database fragments hosted by a node with which the log is associated;

extracting subtransaction ordering information from the logs, the subtransaction ordering information indicating an order in which changes occurred within a transaction, wherein the subtransaction ordering information comprises identifiers, each identifier associated with a change that occurred in the transaction, each identifier previously generated by a component that executed on a node associated with a data fragment in which the change occurred, wherein the component previously generated any identifiers based on a seed passed to the component previous to a time when the change occurred;

ordering change information of the changes that occurred within the transaction according to the subtransaction ordering information; and forwarding the change information to another database to use in updating the other database.

12. The computer storage medium of claim 11, further comprising ordering changes relative to other transactions based on commit times of the transaction and the other transactions.

13. The computer storage medium of claim 11, wherein one or more of the identifiers were generated in parallel without consultation with a centralized sequencing component.

14. A method implemented at least in part by a computer, the method comprising:

receiving logs associated with database fragments, each log associated with a node, each log indicating changes that occurred to one or more database fragments hosted by a node with which the log is associated;

extracting subtransaction ordering information from the logs, the subtransaction ordering information indicating an order in which changes occurred within a transaction, wherein the subtransaction ordering information comprises identifiers, each identifier associated with a change that occurred in the transaction, each identifier previously generated by a component that executed on a node associated with a data fragment in which the change occurred, wherein the component previously generated any identifiers based on a seed passed to the component previous to a time when the change occurred:

ordering change information of the changes that occurred within the transaction according to the subtransaction ordering information; and forwarding the change information to another database to use in updating the other database.

15. The method of claim 14, further comprising providing a seed synchronizer that is operable to potentially update a local seed based on the remote and local seeds by being operable to perform actions comprising determining whether the remote seed is logically after the local seed and if so, updating the local seed to be equal to or logically after the remote seed.

16. The method of claim 14, further comprising providing a identifier generator that is operable to determine an identifier identical to another identifier generator comprises the identifier generator being operable to determine the identifier without regard to identifiers that are being determined in parallel by other identifier generators associated with the transaction.

17. The method of claim 14, further comprising providing a log scanner operable that to access the store to obtain records regarding changes together with their associated identifiers and to send data about the changes derived from the records together with their associated identifiers to a change sorter.

18. The method of claim 14, further comprising providing:

a change sorter that is operable to receive change information associated with subtransactions of the transaction together with associated identifiers and further operable to sort the change information based on the identifiers; and a change exporter that is operable to export the change information to another database for use in updating the other database with the change information.

* * * * *

UNITED STATES PATENT AND TRADEMARK OFFICE
CERTIFICATE OF CORRECTION

PATENT NO. : 8,078,582 B2
APPLICATION NO. : 12/418635
DATED : December 13, 2011
INVENTOR(S) : Rui Wang et al.

It is certified that error appears in the above-identified patent and that said Letters Patent is hereby corrected as shown below:

In column 4, line 10, before "through" insert -- 121 --.

In column 4, line 13, after "bus" insert -- 121 --.

In column 4, line 26, before "are" insert -- 147 --.

In column 4, line 29, after "keyboard" insert -- 162 --.

In column 16, line 5, in Claim 14, delete "occurred:" and insert -- occurred; --, therefor.

Signed and Sealed this
Thirty-first Day of January, 2012

David J. Kappos
*Director of the United States Patent and Trademark Office*